US008756383B2

(12) United States Patent
Tsirkin

(10) Patent No.: US 8,756,383 B2
(45) Date of Patent: Jun. 17, 2014

(54) RANDOM CACHE LINE SELECTION IN VIRTUALIZATION SYSTEMS

(75) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 859 days.

(21) Appl. No.: 12/835,553

(22) Filed: Jul. 13, 2010

(65) Prior Publication Data

US 2012/0017028 A1 Jan. 19, 2012

(51) Int. Cl.
*G06F 13/00* (2006.01)
*G06F 13/28* (2006.01)
*G06F 9/26* (2006.01)
*G06F 9/34* (2006.01)

(52) U.S. Cl.
USPC .... 711/159; 711/203; 711/206; 711/E12.069; 711/E12.016

(58) Field of Classification Search
None
See application file for complete search history.

(56) References Cited

U.S. PATENT DOCUMENTS 7,620,766 B1 * 11/2009 Waldspurger ............... 711/6

* cited by examiner

*Primary Examiner* — Reginald Bragdon
*Assistant Examiner* — Eric S Cardwell
(74) *Attorney, Agent, or Firm* — Lowenstein Sandler LLP

(57) ABSTRACT

A mechanism for random cache line selection in virtualization systems is disclosed. A method includes maintaining a secondary data structure representing a plurality of memory pages, the secondary data structure indexed by a subset of each memory page, determining an index of a received new memory page by utilizing a subset of the new memory page that is a same size and at a same offset as the subset of each memory page, comparing the index of the new memory page with the indices of the secondary data structure for a match, utilizing a main data structure to perform a full page memory comparison with the new memory page if a match is found in the secondary data structure, and updating at least one of the size of the subset, the number of subsets, and the offsets of the subsets used to index the memory page.

18 Claims, 5 Drawing Sheets

RANDOM CACHE LINE SELECTION IN VIRTUALIZATION SYSTEMS

TECHNICAL FIELD

The embodiments of the invention relate generally to virtualization systems and, more specifically, relate to a mechanism for random cache line selection in virtualization systems.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

In some virtualization systems, the host is a centralized server that is partitioned into multiple VMs to provide virtual desktops to users within an enterprise. A problem with centralized hosting of VMs is the use of shared memory amongst the VMs. Typically, each VM is allocated some minimum storage space out of the shared pool of memory. As such, conserving memory becomes an important consideration in virtualization systems.

One solution to conservation of memory is utilization of a memory duplication mechanism. Memory duplication mechanisms allow for memory aggregation in virtualization systems. Specifically, identical memory blocks across VMs are detected and aggregated, allowing for a much higher density of VMs on a given host when running similar VMs. A memory duplication mechanism will compare a new memory page with memory pages already stored on the host and determine if this new memory page is identical to any of the stored memory pages. If so, the memory duplication mechanism will use the single shared version of the memory page instead of storing multiple copies of the same memory page on a host machine.

Part of the memory duplication mechanism is the utilization of a standard data structure, such as a table or a tree structure, to aid in the determination of identical memory pages. If a table structure is used, it will typically provide a hash of the contents of a memory page and the location of that memory page. The hash function will be for the entire contents of the memory page. If a tree structure is used, it will keep the entire page of memory and use those contents for comparison purposes.

In most cases, a new page of memory introduced at a host machine will not find an identical match via the memory duplication mechanism. However, the comparison function used by the memory duplication mechanism can be resource and time consuming as it will perform a full memory page comparisons in order to locate an identical match for the new memory page. Such a full page comparison will utilize space in the CPU cache of the host machine, as well as processing resources of the CPU itself.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
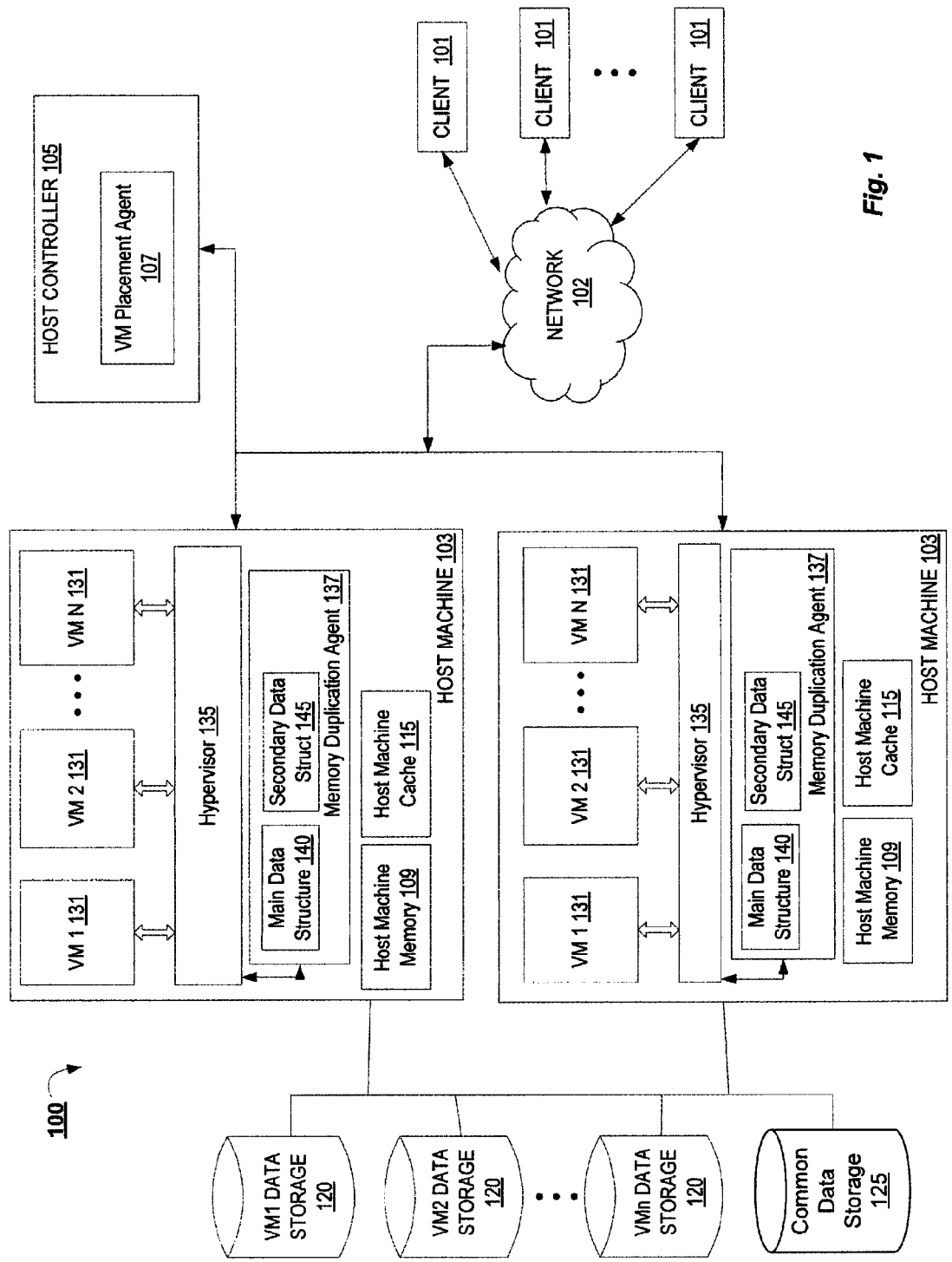
FIG. 1 is a block diagram of an exemplary network architecture in which embodiments of the present invention may operate.

Embodiments of the invention provide a mechanism for random cache line selection in virtualization systems. A method of embodiments of the invention includes maintaining a secondary data structure representing a plurality of memory pages managed by a memory duplication mechanism, the secondary data structure indexed by a subset of each memory page, determining an index of a received new memory page by utilizing a subset of the new memory page that is a same size and at a same offset as the subset of each memory page indexed in the secondary data structure, comparing the index of the new memory page with the indices of the secondary data structure for a match, utilizing a main data structure of the memory duplication mechanism to perform a full page memory comparison with the new memory page if a match is found in the secondary data structure, and updating at least one of the size of the subset, the number of subsets, and the offsets of the subsets used to index the memory page upon the occurrence of at least one of a triggering security event or a predetermine time interval.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "creating", "determining", "comparing", "utilizing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for random cache line selection in virtualization systems. Embodiments of the invention implement a secondary data structure in a memory duplication mechanism of a virtualization system that increases speed of a memory page comparison function by the memory duplication mechanism. This secondary data structure indexes memory pages with a hash function or tree function using one or more subset portions of the memory page of predetermined length, located at random offset location(s). Various implementations of the length and offset can be introduced to increase security. Because the default result of memory page comparison for identifying identical pages is that the pages do not match, embodiments of the invention result in less time and resources to perform a page comparison, as only a small portion of the memory pages are being compared. If a memory page does match a page indexed in this new data structure, then the full page memory comparison can be performed at the main memory dplication mechanism data structure.

FIG. 1 illustrates an exemplary network architecture 100 in which embodiments of the present invention may operate. The network architecture 100 may include a host machine 103 coupled to one or more clients 101 over a network 102. The network 102 may be a private network (e.g., a local area network (LAN), wide area network (WAN), intranet, etc.) or a public network (e.g., the Internet). In some embodiments, clients 101 may be hosted directly by a host machine 103 as a local client on host machine 103. Host machine 103 may be part of a cluster of host machines 103. The host machine 103 may be coupled to a host controller 105 (via a network or directly). Alternatively, the host controller 105 may be part of the host machine 103.

In one embodiment, the clients 101 may include computing devices that have a wide range of processing capabilities. Some or all of the clients 101 may be thin clients, which serve as access terminals for users and depend primarily on the host machine 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host machine 103 and re-direct the received data to a display or other user interface.

In one embodiment, host machine 103 runs one or more virtual machines (VMs) 131. Each VM 131 runs a guest operating system (OS) that may be different from one another. The guest OS may include Microsoft Windows, Linux, Solaris, Mac OS, etc. The host machine 103 may include a hypervisor 135 that emulates the underlying hardware platform for the VMs 131. The hypervisor 135 may also be known as a virtual machine monitor (VMM), a kernel-based hypervisor or a host operating system.

Each VM 131 can be accessed by one or more of the clients 101 over the network 102. In one scenario, the VM 131 can provide a virtual desktop for the client 101. In other embodiments, the VM 131 may provide a virtual server for the client 101. The VMs 131 can be managed by the host controller 105, which may reside on a designated computer system (e.g., a server computer, a desktop computer, etc.) or be part of the host machine 103 or another machine. The host controller 105 may also add a VM, delete a VM, balance the load on the server cluster, provide directory service to the VMs 131, and perform other management functions.

The host machine 103 may also be coupled to data storage 120. Data storage 120 may represent multiple storage devices (e.g., disks in a disk array) associated with individual VMs 131, or a single storage device (e.g., hard drive of the host machine 103) including areas designated for individual VMs 131. When a VM 131 is created, it is associated with individual data storage 120, which may be an independent storage device or a designated area of the storage device.

The host machine 103 may further be coupled to common data storage 125 directly or remotely. Common data storage 125 may represent a designated area of the same storage device as data storage 120 (e.g., a disk drive), an independent storage device coupled with the host machine 103 directly (e.g., a disk drive) or a remote storage device (e.g., network attached storage (NAS), etc.).

In one embodiment, host controller 105 may include a VM placement agent 107. VM placement agent 107 is responsible for making a determination of which host machine 103 a VM 131 should be placed upon its creation. Although only two host machines 103 are shown in FIG. 1, for purposes of explanation assume that a plurality of host machines 103 exist in network 100. In one embodiment, VM placement agent 107 utilizes a general scheduling algorithm that considers a variety of factors for initial placement of a VM 131. Such factors may include, but are not limited to, CPU utilization, CPU speed, memory space, and memory utilization.

In one embodiment, each host machine 103 includes a memory duplication agent 137 that operates to unify shared pages of VMs 131 running on that host machine 103. In one embodiment, the memory duplication agent 137 may be a Kernel Shared Memory (KSM) feature, such as the Kernel SamePage Merging (KSM) feature of a Linux kernel running in host machine 103. The memory duplication agent 137 is generally found inside the host kernel of host machine 103. In some embodiments, the memory duplication agent 137 is utilized by VM placement agent 107 in the initial placement of VMs on host machine 103. In other embodiments, the memory duplication agent 137 is used by hypervisor 135 to reduce memory in migration operations managed by hypervisor 135. In yet other embodiments, the memory duplication agent 137 may be utilized by host machine 103 to reduce memory consumption on host machine 103 in general. In some embodiments, the kernel of each VM 131 may also implement the memory duplication agent 137 to reduce memory consumption and increase page sharing within each VM 131.

Instead of each VM 131 storing identical memory pages separately, the memory duplication agent 137 can identify these shared pages and store one copy of these memory pages in the host machine memory 109 that may be accessed by each VM 131. The memory duplication agent 137 utilizes a main data structure 140, such as an index table or a binary tree, to assist in the page comparison function that it performs to identify identical pages. To reduce memory consumption in embodiments of the invention, the memory duplication agent 137 implements an additional or secondary data structure 145, such as another index table or binary tree structure, to streamline the comparison process of the memory duplication agent 137.

In one embodiment, to implement the secondary data structure 145, the memory duplication agent 137 scans the pages of memory it tracks in the host machine 103. Each page is broken down into a predetermined number of units or blocks of X length. The number of blocks is determined by dividing the size of the page by X. Then, N blocks are chosen uniformly and randomly chosen from each page. In one embodiment, a random number generator (not shown) may be utilized for generate the random number that guides selection of which N blocks of the total range of blocks are to be selected. In some embodiments, the length of each block may be the size of the cache line 115 of the CPU to aid in processing efficiency.

Figure 2:
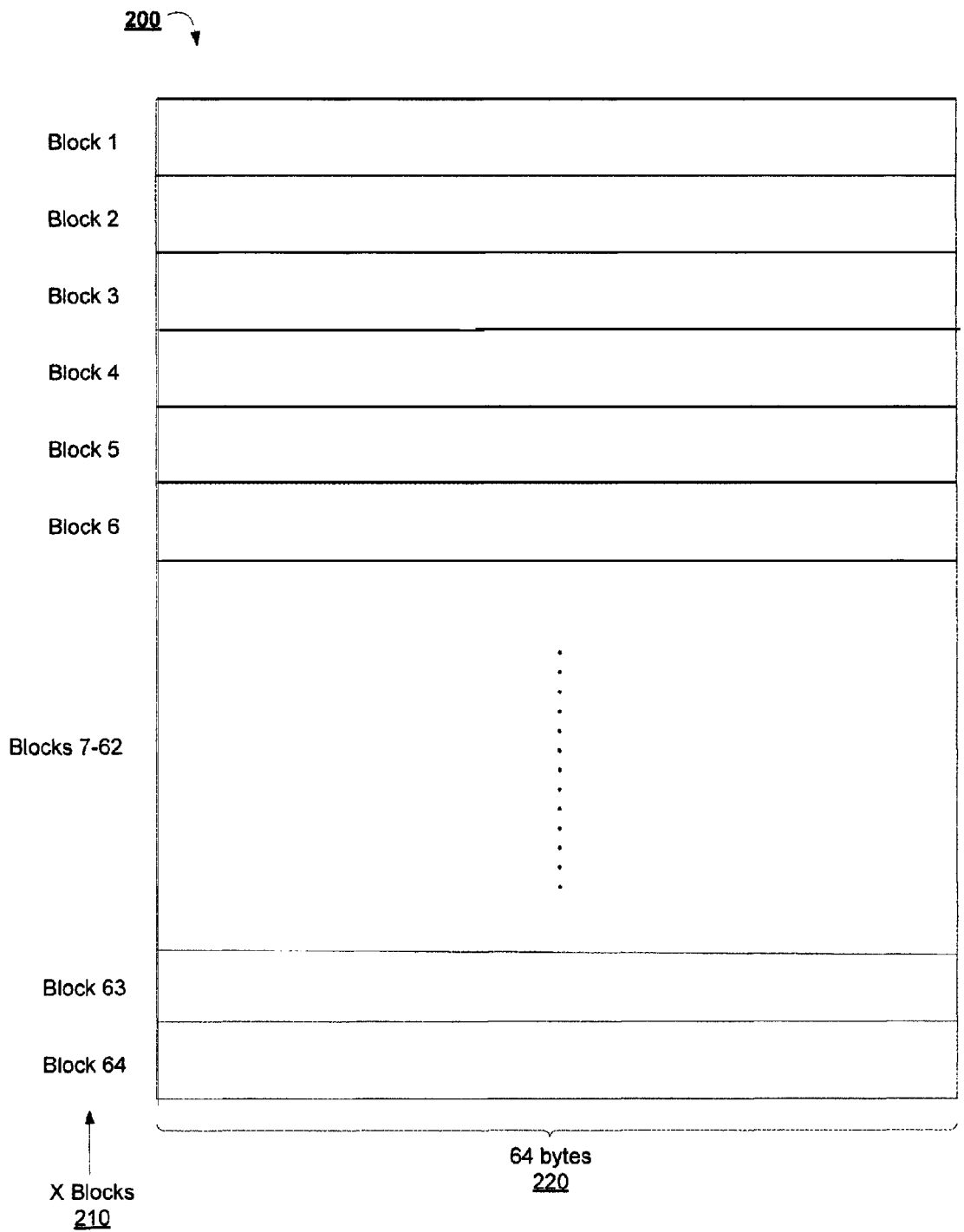
FIG. 2 is a block diagram of an exemplary memory page divided according to an embodiment of the invention.

For instance, assume each memory page is 4 KB, and each page is divided into 64 blocks of 64 bytes each. FIG. 2 is block diagram illustrating such an exemplary memory page 200 of size 4 KB that is divided into X (210)=64 blocks of length (220)=64 bytes each. Assume that each memory page tracked by the memory duplication agent 137 is of the same proportions as memory page 200. The memory duplication agent 137 will then select N random blocks from memory page 200 to be used to index the additional data structure. For example, assume that N=2 and blocks 4 and 57 have been randomly selected for indexing. As a result, blocks 4 and 57 from all memory pages 200 tracked by the memory duplication agent 127 are utilized to index the secondary data structure 145 of embodiments of the invention.

For example, if the secondary data structure 145 is a table, blocks 4 and 57 would be hashed by a predetermined hash function and used as the index into the table. If the secondary data structure 145 is a binary tree, then blocks 4 and 57 would be used to create keys for each node in the binary tree. One skilled in the art will appreciate that embodiments of the invention are not limited to the breakdown of the memory page illustrated in FIG. 2 and described above, and will appreciate that any variety of memory division and block selection may be implemented in embodiments of the invention.

When the memory duplication agent 137 receives a new memory page for determining whether there is an identical match with any of the memory pages managed by the memory duplication agent 137, embodiments of the invention utilize the secondary data structure 145 as a gatekeeper to the use of the main data structure 140. In other words, a comparison is first performed between the new memory pages utilizing the secondary data structure 145. Using the example discussed above, blocks 4 and 57 would be extracted from the new memory page and used to index the secondary data structure 145 to determine if there is a match.

The comparison utilizing the secondary data structure 145 would only determine an identical match between the subset portions of the new memory page and any existing memory pages managed by the memory duplication agent 137. However, this non-full page memory comparison is acceptable as the default behavior for most new memory pages is to not have an identical page match with any memory pages managed by the memory duplication agent 137. If no match is found utilizing the secondary data structure 145, memory sharing will not take place with the new memory page, and operations may continue as normal. On the other hand, if there is a match found utilizing the secondary data structure 145, then a full page comparison is performed with the new memory page using the main data structure 140 (and a 'memcmp' function in one embodiment).

To increase security and reduce the occurrence of collisions (identical matches in the secondary data structure 145, but not the main data structure 140) in embodiments of the invention, the selection of block numbers by the memory duplication agent 137 is generated at random, and may be re-generated at predetermined time intervals. Whenever a new random selection of block numbers is generated, the secondary data structure 145 is rebuilt from scratch due to the order and content changes created by new block selection.

Furthermore, the number, 'N', of blocks to be utilized by the secondary data structure 145 may vary in embodiments of the invention. In some cases, a value of 1 or 2 for N is acceptable. However, N may also be tuned dynamically. If collisions start occurring more frequently when N is a lower order number, then it may be increased by the memory duplication agent 137. On the other hand, if the number of collisions begins to decrease, N may be reduced to increase efficiency in time and processing. An increase in the value of N will require the secondary data structure 145 to be rebuilt from scratch. A decrease in the value of N will require the secondary data structure 145 to be modified.

Figure 3:
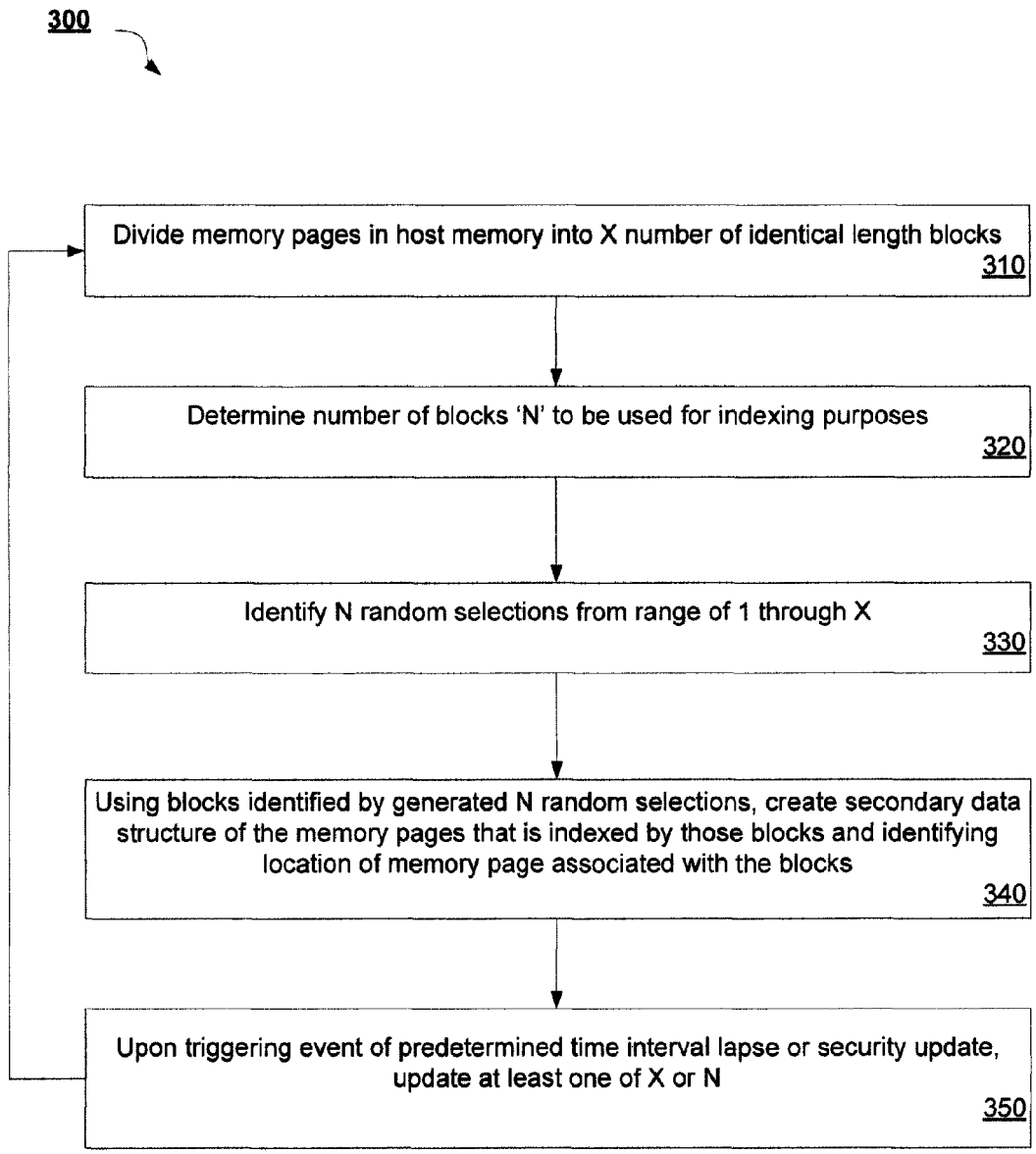
FIG. 3 is a flow diagram illustrating a method for creation of a secondary data structure for a KSM feature in virtualization systems according to an embodiment of the invention.

FIG. 3 is a flow diagram illustrating a method 300 for creation of a secondary data structure for a memory duplication mechanism in virtualization systems according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by memory duplication agent 137 of host machine 103 of FIG. 1.

Method 300 begins at block 310 where memory pages in memory of a host are divided into 'X' number of identical length blocks. Then, at block 320, a number of blocks, 'N', is determined to be used for indexing purposes. In some embodiments, N may be equal to 1 or 2. Then, at block 330, N random selections are identified from the range of 1 through X. For example, if X=64 and N=2, then 2 numbers between 1 and 64 are randomly selected. In some embodiments, a random number generator or some other form of random selection may be utilized to identify the N selections.

At block 340, a secondary data structure representing the memory pages is created. The blocks identified by the N random selections in block 330 are used to create this secondary data structure. Specifically, the blocks identified by the N random selections are used to create an index for the secondary data structure, with each indexed entry of the secondary data structure providing a location of a corresponding memory page. In one embodiment, the secondary data structure is an index table, while in other embodiments the secondary data structure may be a binary tree.

Lastly, at block 350, at least one of 'X' or 'N' is updated upon a triggering event. In one embodiment, the triggering event is the lapse of a predetermined time interval. In another embodiment, the triggering event is a security update of 'X' or 'N' occurring because of an increase or decrease in collisions at the secondary data structure. Collisions refer to the occurrence of two memory pages having the same index but different content. For instance, when a predefined number of collisions occurs, either or both of the size (X) or the number (N) of blocks is increased. Furthermore, the number and/or size of blocks can be decreased after an interval of time if it is determined that reducing the number and/or size will not create a number of new collisions above the threshold set by N and/or X.

Figure 4:
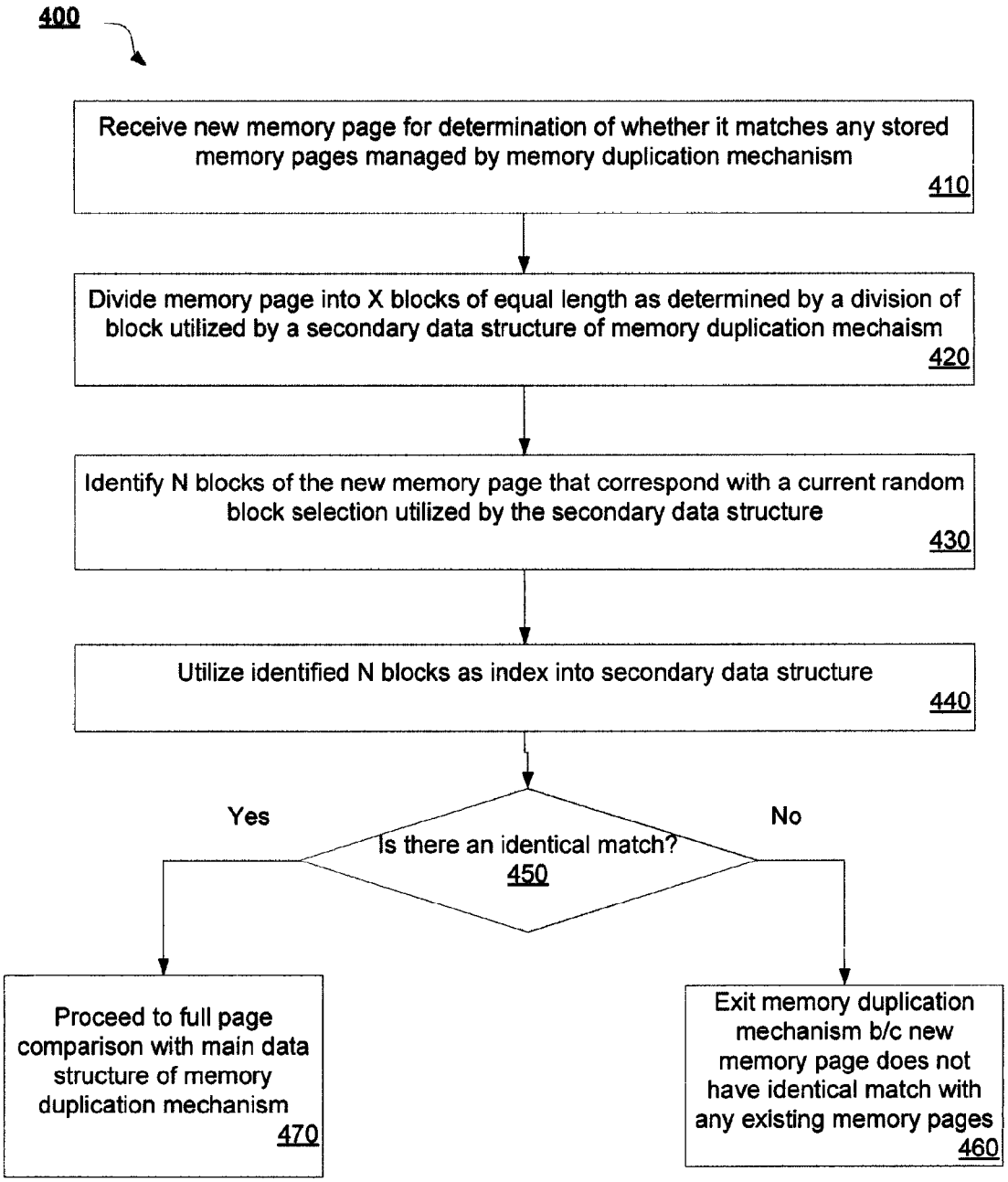
FIG. 4 is a flow diagram illustrating a method for utilization of a secondary data structure in a KSM feature in virtualization systems according to an embodiment of the invention.

FIG. 4 is a flow diagram illustrating a method 400 for utilization of a secondary data structure in a memory duplication mechanism in virtualization systems according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by memory duplication agent 137 of host machine 103 of FIG. 1.

Method 400 begins at block 410 where a new memory page is received for determination of whether the page matches any stored memory pages managed by a memory duplication feature. At block 420, the memory page is divided into X blocks of equal length, where the 'X' is the same as a division of memory pages utilized by a secondary data structure of the memory duplication mechanism. Then, at block 430, 'N' number of the 'X' blocks of the memory page are identified that correspond with a current random block selection utilized by the secondary data structure. For instance, if memory pages tracked by the secondary data structure are divided into X=64 blocks of equal length, N=1, and the block 32 has been randomly selected, then at block 430, block 32 of the new memory page would also be identified.

At block 440, the identified N blocks are utilized as an index into the secondary data structure. In some embodiments, the secondary data structure is an index table, while in other embodiments the secondary data structure may be a binary tree. At decision block 450, it is determined whether there is an identical match between the portion of the new memory page that is indexing the secondary data structure and any of the indexed entries in the secondary data structure. For example, if the secondary data structure is an index table using hash functions, then a match would result if the result of applying the hash function to the identified N blocks of the new memory page matches any of the existing index entries in the secondary data structure.

If there is no match found in the secondary data structure, then at block 460 the memory duplication mechanism is exited as the new memory page will not be an identical match for any of the existing memory pages in the host. On the other hand, if a match is found with the secondary data structure, then at block 470 a full page comparison is performed with the new memory page utilizing a main data structure of the memory duplication mechanism.

Figure 5:
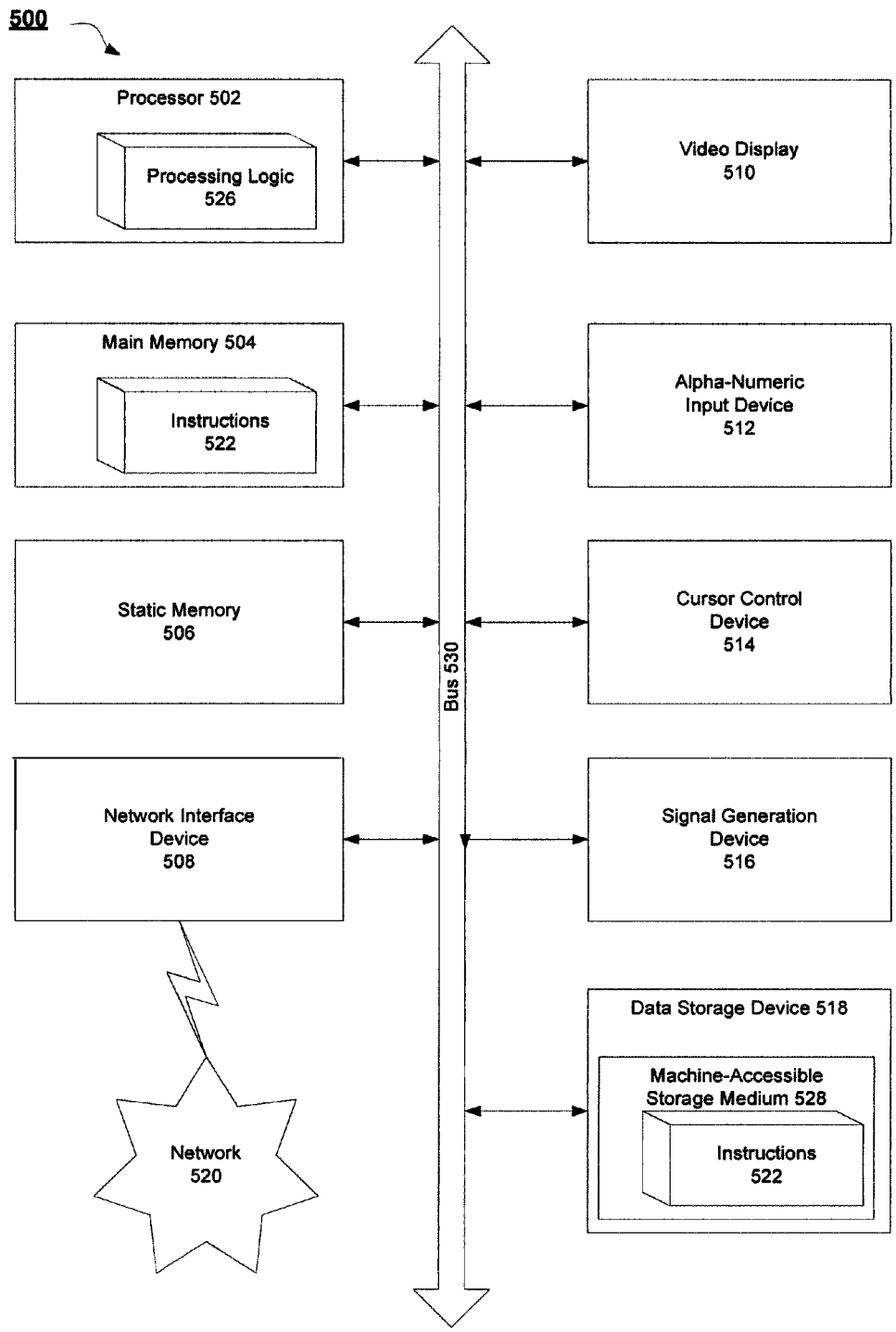
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform random cache line selection in virtualization systems by host machine 103 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform methods 300 and 400 for random cache line selection in virtualization systems described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
maintaining, by a memory duplication agent executed by a processing device of a host machine, a secondary data structure representing a plurality of memory pages managed by the memory duplication agent, wherein each of the plurality of memory pages are divided into a plurality of blocks of identical length;
determining, by the memory duplication agent, an index of a received new memory page by:
selecting a plurality of offsets corresponding to the plurality of blocks from the new memory page, wherein the offsets are randomly selected, and consistent for each of the plurality of memory pages indexed in the secondary data structure; and
generating the index for the new memory page utilizing the selected plurality of offsets;
comparing, by the memory duplication agent, the index of the new memory page with the indices of the secondary data structure for a match;
in response to finding a match in the secondary data structure, utilizing, by the memory duplication agent, a main data structure of the memory duplication agent to perform a full page memory comparison with the new memory; and
updating, by the memory duplication agent, at least one of the size of the blocks, the number of blocks, or the offsets of the blocks used to index the memory page upon the occurrence of at least one of a triggering security event or a time interval.

2. The method of claim 1, wherein the secondary data structure is an index table and the index to the index table is determined with a hash function.

3. The method of claim 1, wherein the secondary data structure is a binary tree and the index to the binary tree is a key.

4. The method of claim 1, wherein at least one of the one or more random offsets or the predetermined number of blocks is randomly selected in order to increase security of the secondary data structure.

5. The method of claim 4, wherein the secondary data structure is at least one of rebuilt or modified whenever the at least one of the one or more random offsets or the predetermined number of blocks is changed.

6. The method of claim 1, wherein the memory duplication agent aggregates identical memory pages to reduce memory consumption of the host machine.

7. A system, comprising:
a processing device;
a memory communicably coupled to the processing device;
a hypervisor to execute one or more virtual machines (VMs) from the memory that share use of the processing device; and
a memory duplication agent communicably coupled to the hypervisor, the memory duplication agent to:
maintain a secondary data structure representing a plurality of memory pages of the one or more VMs, wherein each of the plurality of memory pages are divided into a plurality of blocks of identical length, and wherein the secondary data structure managed by the memory duplication agent;
determine an index of a received new memory page by:
selecting a plurality of offsets corresponding to the plurality of blocks from the new memory page, wherein the offsets are randomly selected, discontiguous, and consistent for each of the plurality of memory pages-indexed in the secondary data structure; and
generating the index for the new memory page utilizing the selected plurality of offsets;
compare the index of the new memory page with the indices of the secondary data structure for a match;
in response to finding a match in the secondary data structure, utilize a main data structure of the memory duplication agent to perform a full page memory comparison with the new memory; and
update at least one of the size of the blocks, the number of blocks, or the offsets of the blocks used to index the memory page upon the occurrence of at least one of a triggering security event or a time interval.

8. The system of claim 7, wherein the secondary data structure is an index table and the index to the index table is determined with a hash function.

9. The system of claim 7, wherein the secondary data structure is a binary tree and the index to the binary tree is a key.

10. The system of claim 7, wherein at least one of the one or more random offsets or the predetermined number of blocks is randomly selected to increase security of the secondary data structure.

11. The system of claim 10, wherein the secondary data structure is at least one of rebuilt or modified whenever the at least one of the one or more random offsets or the predetermined number of blocks is changed.

12. The system of claim 7, wherein the memory duplication agent further to aggregate identical memory pages to reduce memory consumption of the host machine.

13. A non-transitory machine-readable storage medium including data that, when accessed by a processing device, cause the processing device to perform operations comprising:
 maintaining, by the processing device of a host machine, a secondary data structure representing a plurality of memory pages managed by a memory duplication agent, wherein each of the plurality of memory pages are divided into a plurality of blocks of identical length;
 determining, by the memory duplication agent, an index of a received new memory page by:
  selecting a plurality of offsets corresponding to the plurality of blocks from the new memory page, wherein the offsets are randomly selected, discontiguous, and consistent for each of the plurality of memory pages indexed in the secondary data structure; and
  generating the index for the new memory page utilizing the selected plurality of offsets;
 comparing, by the memory duplication agent, the index of the new memory page with the indices of the secondary data structure for a match;
 in response to finding a match in the secondary data structure, utilizing, by the memory duplication agent, a main data structure of the memory duplication agent to perform a full page memory comparison with the new memory; and
 updating, by the processing device, at least one of the size of the blocks, the number of blocks, or the offsets of the blocks used to index the memory page upon the occurrence of at least one of a triggering security event or a time interval.

14. The non-transitory machine-readable storage medium of claim 13, wherein the secondary data structure is an index table and the index to the index table is determined with a hash function.

15. The non-transitory machine-readable storage medium of claim 13, wherein the secondary data structure is a binary tree and the index to the binary tree is a key.

16. The non-transitory machine-readable storage medium of claim 13 wherein at least one of the one or more random offsets or the predetermined number of blocks is randomly selected to increase security of the secondary data structure.

17. The non-transitory machine-readable storage medium of claim 13, wherein the secondary data structure is at least one of rebuilt or modified whenever the at least one of the one or more random offsets or the predetermined number of blocks is changed.

18. The non-transitory machine-readable storage medium of claim 13, wherein the memory duplication agent aggregates identical memory pages to reduce memory consumption of the host machine.

* * * * *